H. MEYER.
Cane Mill.

No. 20,288.

2 Sheets—Sheet 1.

Patented May 18, 1858.

H. MEYER.
Cane Mill.
No. 20,288.
2 Sheets—Sheet 2.
Patented May 18, 1858.
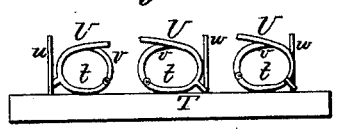
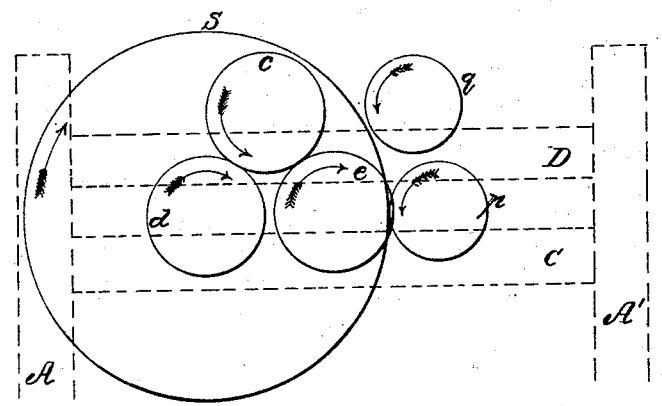

UNITED STATES PATENT OFFICE.

HENRY MEYER, OF BRIDGETON, NEW JERSEY.

IMPROVEMENT IN MILLS FOR TREATING CHINESE SUGAR-CANE.

Specification forming part of Letters Patent No. 20,288, dated May 18, 1858.

*To all whom it may concern:*

Be it known that I, HENRY MEYER, of Bridgeton, in the county of Cumberland and State of New Jersey, have invented a new and Improved Mill for Treating Chinese Sugar-Cane; and I do hereby declare the following to be a full, clear, and exact description of the same, reference being had to the accompanying drawings, and to the letters of reference marked thereon.

My invention consists in a combination of expanding strippers with a system of rollers, and in an arrangement of the latter and certain strips and a revolving knife, fully described hereinafter, the whole being designed for the purpose of stripping the leaves from the stalks of the Chinese sugar-cane prior to their being submitted to the rollers, and for the purpose of cutting the spent stalks into suitable lengths to be used as fodder for cattle.

In order to enable others skilled in the art to make and use my invention, I will now proceed to describe its construction and operation.

Figure 1:
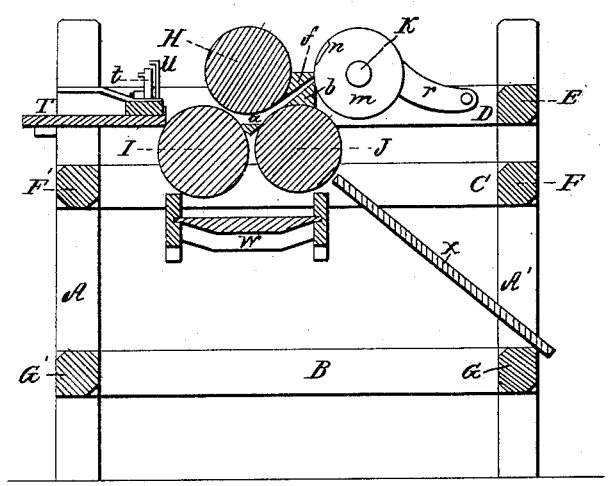
Figure 2:
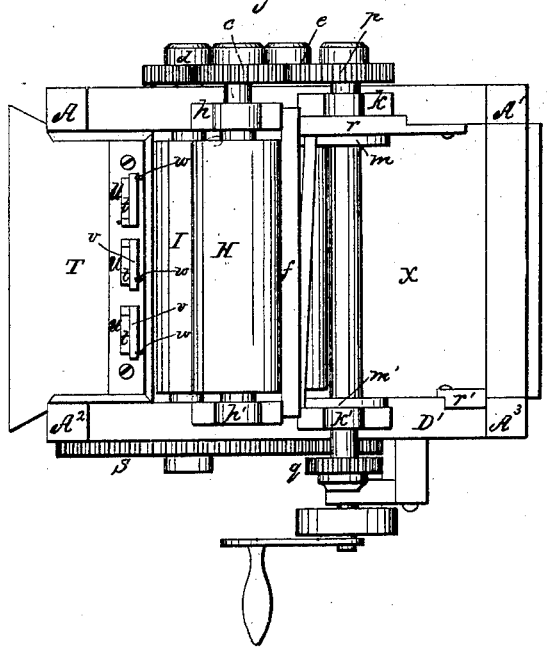

On reference to the accompanying drawings, which form a part of this specification, Figure 1 is a sectional elevation of my improved mill for treating Chinese sugar-cane; Fig. 2, a ground plan of the same; Fig. 3, a view of the strippers; Fig. 4, a diagram showing the system of gearing for driving the rollers and knife.

The frame is composed of the four uprights, A, A', A², and A³, the longitudinal bars B, C, and D on each side, the transverse bars E, F, and G on one end, and the bars F' and G' on the opposite end.

H, I, and J are three metal rollers, the upper roller turning in suitable boxes, $h$ and $h'$, secured to the opposite bars, D and D', the lower rollers, I and J, turning in similar boxes attached to the opposite bars, C. The roller H is furnished with a cog-wheel, $c$, which gears into a similar wheel, $d$, on the roller I, as well as into a similar wheel on the roller J, so that the three rollers may move simultaneously and at the same speed, as in ordinary three-roller sugar-mills. In the space between the three rollers, and to the opposite bars, D, is secured an angular strip, $a$, between which and the lower rollers sufficient space is left for the juice to pass. To the bars D and D' are also secured two other angular strips, $b$ and $f$, the former being in close contiguity with the roller J, and the latter with the roller H, and both being arranged in such a manner that an inclined space shall be formed between the two. A shaft, K, is arranged to turn and to slide laterally to a limited extent in boxes $k$ and $k'$, secured to the opposite bars, D and D'. To this shaft are secured two collars, $m$ and $m'$, to which are attached the opposite ends of the inclined cutter $n$. One end of the shaft K is furnished with a cog-wheel, $p$, and the other end with a cog-wheel, $q$, the former gearing into the wheel $e$ of the roller J, and the latter into a larger wheel, S, on the roller I. To the inside of the opposite bars, D and D', are hung the pawls $r$ and $r'$, the pawl $r$ being arranged to fit between the collar $m$ and box $k$, and the pawl $r'$ between the collar $m'$ and box $k'$, so that by throwing back the pawl $r'$ and dropping the pawl $r$ between the collar and box the wheel $p$ is in gear with the wheel $e$; and when the pawl $r$ is thrown back the shaft K may be slid so that the wheel $p$ is out of gear and the wheel $q$ in gear with the wheel S, in which position it may be retained by simply dropping the pawl $r'$ between the collar $m'$ and box $k'$. In front of the machine is a platform, F, upon which are situated any convenient number of strippers, U U U, each of which consists of a curved piece of metal, $t$, secured permanently to the platform; and to this curved piece is hinged another curved piece, $v$, the upward and outward movement of which is limited by the projecting portion of the rod $w$, the latter being connected to the platform, so that the two curved pieces together form an expanding hoop.

W is a chute for conveying the juice of the cane to any suitable receptacle, and X is another chute, down which pass the spent stalks after being submitted to the action of the revolving cutter.

The rollers being set in motion, the attendant passes the ends of the cane-stalks through the expanding strippers U, and directs them between the rollers H and I, which draw the stalks through the strippers, the latter tearing off the leaves and expanding gradually, so as to accommodate themselves to the thicker portions of the cane. The angular strip $a$ directs the cane between the rollers H and J, which force it up through the space between the angular strips *f* and *b*. As the cane passes from the latter, it is cut into convenient lengths by the revolving knife *n*, the pieces falling into the shute X and thence to the ground. The spent stalks may be cut into shorter lengths by sliding the wheel *q* into gear with the wheel S.

The leaves of the Chinese sugar-cane offer considerable obstruction to the effective extraction of the juice by the rollers; hence the use of the expanding strippers. The spent canes affording excellent fodder for cattle, it is desirable that the canes should be cut into convenient lengths which may be readily conveyed away, instead of allowing them to rot on the ground, as usual.

I do not claim, separately, the expanding strippers, the system of rollers, or the revolving knife, as each of these devices have been used in other machines; but

I claim—

1. The arrangement, substantially as herein described, of the rollers H, I, and J, the strips *a, f*, and *b*, and the revolving cutter *n*, for the purpose specified.

2. The expanding strippers U, in combination with the rollers H, I, and J, the same being arranged in relation to each other as and for the purpose set forth.

In testimony whereof I have signed my name to this specification before two subscribing witnesses.

HENRY MEYER.

Witnesses:
 DANIEL M. WOODRUFF.
 ENOCH HAWTHORN.